Patented July 11, 1933

1,917,338

UNITED STATES PATENT OFFICE

HERBERT G. STONE, OF KINGSPORT, TENNESSEE, ASSIGNOR TO EASTMAN KODAK COMPANY, OF ROCHESTER, NEW YORK, A CORPORATION OF NEW YORK

NEUTRALIZATION OF PYROLIGNEOUS ACID

No Drawing.   Application filed November 18, 1931.   Serial No. 575,973.

This invention relates to the neutralization of pyroligneous acid obtained in the distillation of wood. Its object is to provide a process for neutralizing pyroligneous acid with sodium carbonate without foaming which has heretofore been encountered.

When the ultimate product to be made from pyroligneous acid is sodium acetate, there is obvious advantage in neutralizing directly with sodium carbonate, instead of neutralizing with milk of lime to obtain calcium acetate and then converting the latter into sodium acetate. Neutralizing pyroligneous acid with sodium carbonate is old in the art, as shown, for instance, in my Patent No. 1,857,520. However, it has always been considered extremely difficult to neutralize pyroligneous acid satisfactorily with sodium carbonate, due to excessive foaming caused by the liberation of carbon dioxide in the solution containing large quantities of tars and oils. This necessitated the use of very large neutralization vessels, and rendered the neutralization a time-consuming operation, as it was necessary to add the sodium carbonate slowly.

I have found that pyroligneous acid may be neutralized with sodium carbonate without foaming if the neutralization is carried out in two stages, so that the sodium carbonate is first converted into the bicarbonate, and later entirely neutralized. When a given quantity of pyroligneous acid is to be neutralized, the amount of sodium carbonate which will be required to neutralize it is calculated. Approximately half of the given quantity of pyroligneous acid is run into the neutralizing tub, and the entire calculated charge of sodium carbonate is added. After a few minutes of stirring, (the sodium carbonate having been converted into the bicarbonate) the rest of the pyroligneous acid is run in, stirring being continued meanwhile. This method of neutralization is not accompanied by any violent evolution of carbon dioxide, and foaming of the tars and oils is completely eliminated. This results in a material saving in equipment, as smaller neutralization vessels may be used. Moreover, as the neutralization of a given amount of pyroligneous acid may be carried out more quickly, a smaller number of neutralization vessels are needed for a given output of sodium acetate. It will be apparent that somewhat less than half or even a little more than half of the acid may be added to the sodium carbonate, depending somewhat upon the acid being neutralized. It is a more satisfactory rule to add a little less than half of the acid as foaming is thus more certainly eliminated.

For example, if 1100 pounds of sodium carbonate is required to neutralize 2300 gallons of pyroligneous acid, one may first add about 1000 gallons of pyroligneous acid to the tank and then add all of the 1100 pounds of soda ash. After a few minutes stirring, the rest of the pyroligneous acid is added with further stirring.

The impure sodium acetate obtained by this process may be purified, for example, by the heating process described in my Patent No. 1,857,520, or in any other suitable manner.

While I have described the neutralization of pyroligneous acid with sodium carbonate to obtain sodium acetate, it will be apparent that my process may be applied to the neutralization of pyroligneous acid with any of the common alkali metal carbonates to obtain the corresponding alkali metal acetates.

What I claim as my invention and desire to be secured by Letters Patent of the United States is:

1. In a process of neutralizing pyroligneous acid with an alkali metal carbonate, the steps of adding the alkali metal carbonate to sufficient pyroligneous acid to convert it into alkali metal bicarbonate, and then adding sufficient pyroligneous acid to complete the neutralization of the alkali metal carbonate.

2. In a process of neutralizing pyroligneous acid with sodium carbonate, the steps of adding the sodium carbonate to sufficient pyroligneous acid to convert it into sodium bicarbonate, and then adding sufficient pyroligneous acid to complete the neutralization of the sodium carbonate.

3. In a process of neutralizing pyroligneous acid with sodium carbonate, the steps which comprise adding to the total amount of sodium carbonate required for the neutralization, approximately half of the acid to be neutralized and then adding the remainder of the acid.

4. In a process of neutralizing pyroligneous acid with an alkali metal carbonate, the steps which comprise reacting the alkali metal carbonate with approximately sufficient pyroligneous acid to convert the alkali metal carbonate into alkali metal bicarbonate and then reacting the alkali metal bicarbonate with a further quantity of pyroligneous acid sufficient to neutralize the alkali metal bicarbonate and any remaining alkali metal carbonate.

5. In a process of neutralizing pyroligneous acid with sodium carbonate, the steps which comprise reacting the sodium carbonate with approximately sufficient pyroligneous acid to convert the sodium carbonate into sodium bicarbonate and then reacting the sodium bicarbonate with a further quantity of pyroligneous acid sufficient to neutralize the sodium bicarbonate and any remaining sodium carbonate.

Signed at Kingsport, Tenn. this 11th day of November 1931.

HERBERT G. STONE.